United States Patent Office 3,423,291
Patented Jan. 21, 1969

1

3,423,291
CONTROL OF REFLUX TO A FRACTIONATOR
Minor W. Oglesby, Bartlesville, Okla., assignor to Phillips
Petroleum Company, a corporation of Delaware
Filed Dec. 14, 1964, Ser. No. 417,982
U.S. Cl. 202—160      7 Claims
Int. Cl. B01d 3/42

ABSTRACT OF THE DISCLOSURE

The flow of external reflux to a fractionator is controlled in response to a computation of internal reflux. In this computation, the measured temperature differential between the overhead vapors and external reflux is compared with a minimum reference $\Delta T$, and the larger value is employed to prevent overloading of the condenser. Addition compensation can be made by use of a signal which is representative of the difference between the bubble point temperature and dew point of the external reflux.

---

This invention relates to the control of reflux to a fractionator. In another aspect, it relates to a method and apparatus for computing and controlling the flow of external reflux to a fractional distillation column.

There is ever-increasing activity in the art of fractionating multi-component mixtures to optimize this type of separation. For example, in the case of fractional distillation columns, many methods and means have been proposed, patented or used in an effort to reduce the column's numerous degrees of freedom, which are characterized as independent input variables, some of which are controllable, e.g., feed temperature, and others of which are uncontrollable, e.g., ambient temperature.

A recent improvement in controlling fractional distillation columns is the automatic control of internal reflux, which is defined as the sum of the external reflux fed to the top of the column plus the vapor which is condensed on the tray at the top of the column by said external reflux. The internal reflux can be calculated by the following equation or explicit function, derived from the material and heat balances on the top tray:

$$R_i = R_e + R_e \left(\frac{C_p}{\lambda}\right) \Delta T \qquad (1)$$

which can be rewritten as:

$$R_i = R_e(1 + K\Delta T) \qquad (2)$$

where $R_i$=mass flow rate of liquid leaving the top tray in the column (or internal reflux flow rate) (lbs./hr.)
$R_e$=mass flow rate of liquid entering top tray (or external reflux flow rate) (lbs./hr.)
$C_p$=specific heat of external reflux (B.t.u./lb.$\times$° F.)
$\lambda$=heat of vaporization of liquid on top tray (B.t.u./lb.)
$K = C_p/\lambda$
$T = T_0 - T_R$ (° F.)
$T_0$=temperature (° F.) of liquid on top tray or vapor therefrom
$T_R$=temperature (° F.) of external reflux Thus, the internal reflux can be computed from the measurement of differential temperature $\Delta T$ and external reflux flow rate $R_e$. The constant K is quite insensitive to composition changes for any one particular fractionator. It can be seen that a change in $\Delta T$ can be compensated by manipulating the external reflux flow rate $R_e$ to hold the internal reflux flow rate $R_i$ constant. Regardless of whether a change originates in the column or without, the internal reflux flow rate $R_i$ can be maintained constant by manipulating the external reflux flow rate $R_e$. This method of controlling the internal reflux flow rate is of particular value where air-fan coolers are used for reflux condensation, which method compensates for the changes in ambient conditions which would otherwise affect such condensation and in turn the fractionation.

Where the overhead from the fractionator contains a significant amount of one or more components whose boiling points are significantly lower than that of the light key component or components therein, $\Delta T$ is not an accurate indication of the change that must be made in the flow rate of the external reflux. Accordingly, if one subtracts from $\Delta T$ a value proportional to the difference between the bubble point of the external reflux and its dew point, the internal reflux is more accurately computed. Accordingly, Equation 5 can be rewritten as follows to take into account this modification:

$$R_i = R_e[1 + K(\Delta T - k_0)] \qquad (3)$$

where:

$k_0$ is the difference between the bubble point temperature (° F.) of the external reflux and the dew point (° F.) of the external reflux.

In the operation of fractional distillation columns, in some cases, the overhead condensing capacity is exceeded before the desired tray liquid loading is reached. The internal reflux computer described above will not recognize when the condenser capacity is reached. When this situation occurs, the external reflux temperature rises, decreasing the $\Delta T$ measurement. The internal reflux computer, consequently, increases the flow rate of the external reflux in order to hold the internal reflux constant. As a result, the overhead vapor flow increases, which in turn causes an increase in load on the overhead condenser, which in turn decreases the $\Delta T$ measurement further. If allowed to continue, this will result in loss of column pressure control.

According to this invention, the internal reflux control of a fractional distillation column is improved in that the progressive overloading of condenser capacity is automatically corrected by comparing the $\Delta T$ measurement with a minimum predetermined $\Delta T$ value which may exist without overloading the condenser. This minimum $\Delta T$ value, hereinafter referred to as $\Delta T_m$, can be supplied from a potentiometer or pressure regulator to decision means along with the measured $\Delta T$ and the numerically high value selected therein for computing the internal reflux. If the measured $\Delta T$ decreases to that of the $\Delta T_m$, the differential temperature signal used in computation of internal reflux flow rate is prevented from decreasing further, thereby preventing consequent increase in external reflux flow rate due to a further drop in $\Delta T$ below the $\Delta T_m$. Consequently, the overloading of the condenser and ultimate loss of column control are prevented by this invention.

Various other objects, advantages and features of the invention will become apparent from the following detailed description taken in conjunction with the accompanying drawings in which FIGURE 1 is a schematic diagram illustrating the application of the invention to a fractionation column;

FIGURE 4 is a schematic drawing of a modified portion of the computing apparatus.

Figure 1:
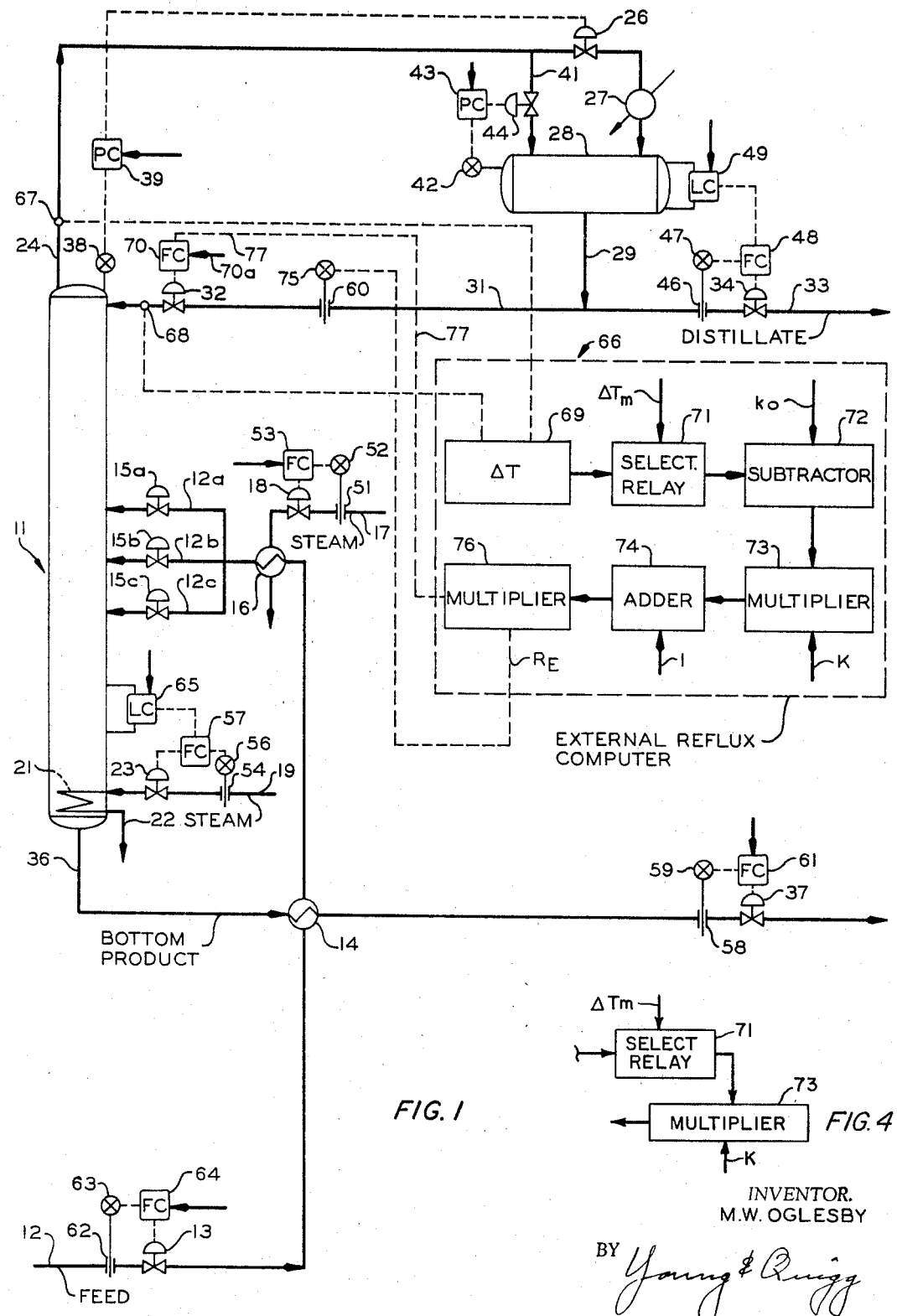

Referring to FIGURE 1, of the drawing, there is shown a conventional fractional distillation column 11, which can be provided with a plurality of vertically-spaced liquid-vapor contact trays (not shown). Feed comprising a multicomponent mixture to be separated is supplied via line 12 and introduced by any one of a plurality of feed inlet lines 12a, 12b, 12c onto a desired feed tray in column 11 located at an intermediate level therein, the flow rate of the feed being controlled by valve 13. Feed line 12 is associated with an indirect heat exchanger or economizer 14 and a second indirect heat exchanger or preheater 16. An indirect heat exchange medium such as steam is supplied via line 17 to preheater 16, the flow rate of the heat exchange medium being controlled by valve 18. Heat is supplied to the kettle of column 11 by supplying steam or other heat exchange medium from line 19 to reboiler coil 21, the condensed heat exchange medium being withdrawn from the coil via line 22. The flow rate of the heat exchange medium in line 19 is controlled by valve 23.

Vapors are removed from the top of column 11 through overhead line 24, the flow rate being controlled by valve 26, and passed through a cooler or condenser 27 such as an air-cooled condenser, the resulting liquid being passed to an accumulator 28. Liquid distillate in accumulator 28 is withdrawn via line 29, and a portion of this withdrawn liquid is recycled via line 31 as external reflux to the top of column 11, the flow rate of the external reflux being controlled by valve 32. The balance of the liquid distillate withdrawn from accumulator 29 is removed from the system through line 33 and yielded as distillate product, the flow rate being controlled by valve 34. Bottom product is withdrawn from the kettle of column 11 via line 36 and it is passed in indirect heat exchange relationship through economizer 14 with the feed in line 12, the flow rate of the bottom product being controlled by valve 37.

The degrees of freedom of the distillation column of FIGURE 1 can be reduced by providing it with controls well known in the art. Referring now to the drawing, a constant pressure in the top of column 11 can be maintained by an assembly comprising a pressure transducer 38 and pressure controller 39 in conjunction with control valve 26.

A constant pressure can be maintained in accumulator 28 by passing a small amount of overhead vapor from line 24 directly to accumulator 28 via by-pass line 41, the constant pressure being provided by an assembly comprising pressure transducer 42, pressure controller 43 and flow control valve 44.

The flow rate in distillate product line 33 can be controlled by an assembly comprising orifice plate 46, differential pressure transducer 47 and flow controller 48 in conjunction with control valve 34, the setpoint of flow controller 48 being manipulated by a liquid level controller 49 associated with accumulator 28, so as to maintain a constant liquid level in the accumulator.

The volume flow rate of steam in line 17 can be controlled by an assembly comprising orifice plate 51, differential pressure transducer 52 and flow controller 53 in conjunction with flow control valve 18. The volume flow rate of steam in line 19 can be controlled by an assembly comprising orifice plate 54, differential pressure transducer 56, flow controller 57 in conjunction with flow control valve 23.

The flow rate of bottom product in line 36 can be controlled by an assembly comprising orifice plate 58, differential pressure transducer 59 and flow controller 61 in conjunction with control valve 37. Similarly, the flow rate of feed in line 12 can be controlled by an assembly comprising orifice plate 62, differential pressure transducer 63 and flow controller 64 in conjunction with flow control valve 13.

The feed can be directed onto the desired feed tray by opening one of valves 15a, 15b, 15c and closing the other two.

The flow rate in the external reflux line 31 is controlled by the computer 66 through a flow sensing element 60, and a linear flow rate transducer 75. A signal is fed from computer 66 by a line 77 to a flow controller 70 which operates in conjunction with flow control valve 32.

Further reduction in the degrees of freedom of the column can be accomplished by using the level of liquid in the kettle of column 11 to manipulate the volume of steam passed via line 19 to coil 21. This can be done by an assembly comprising a liquid level controller 65 which manipulates the setpoint of flow controller 57. The use of these control features of the prior art reduces the number of the degrees of freedom of the column.

One embodiment of the control system of this invention is also illustrated in FIGURE 1 and is designated by broken line 66, this particular embodiment comprising a novel assembly of several conventional pneumatic instrument components. The term $\Delta T$ of Equation 3 is measured by subtracting the temperature $T_R$ of the external reflux passed to the column from the temperature $T_0$ of the vapor removed from the top of column 11 in temperature differential transducer 69. Measurement of $T_0$ and $T_R$ is accomplished by temperature sensing elements 67 and 68, respectively, such as thermocouples which are connected in opposition to each other. The signals from temperature sensing elements 67 and 68 are applied as inputs to a temperature differential transmitter 69, which provides an output signal representative of $\Delta T$.

Signal $\Delta T$ is applied to a selective relay 71, such as a high pass relay, a signal proportional to $\Delta T_m$ also being supplied to this relay. Relay 71 compares the signals $\Delta T$ and $\Delta T_m$ and passes as the output signal the higher of the two input signals, this output signal (which is indicative of the condensing capabilities of the condenser 27) being supplied to an analog subtractor 72. The latter subtracts a signal proportional to $k_0$ from the input signal from relay 71 and the resultant remainder signal is supplied as an input to an analog multiplier 73 where it is multiplied by an input signal proportional to K. Multiplier 73 produces an output signal proportional to $K(\Delta T - k_0)$, where $\Delta T$ is either the measured differential temperature or the limiting differential temperature, whichever is the larger, and supplies this signal to analog adder or summer 74 where a value proportional to 1.0 is added. The output signal from adder 74 is then supplied to an analog multiplier 76 where it is multiplied by a signal proportional to the flow rate of the external reflux, $R_e$, the latter being a measured value (for example as measured by orifice meter 60 and transmitted by linear flow transmitter 65) or an implicitly derived value. Multiplier 76, accordingly, produces an output signal 77 representative of internal reflux flow rate which is employed as the measurement signal for flow controller 70 manipulating the flow rate of external reflux in line 31 to achieve a desired setpoint value, as set at 70a.

In operation, when the condenser 27 is not overloaded, the signal $\Delta T$ is higher than the signal $\Delta T_m$, and the output 77 of this computer, $R_i$, is $R_e[K(\Delta T-k_0)+1]$. Accordingly, the output of the computer supplies the measurement to unit 70 in accordance with Equation 3 whereby the external reflux is regulated to a desired value for optimum column operation. Should the condenser 27 become overloaded, the magnitude of the signal $\Delta T$ drops until it is less than the signal $\Delta T_m$. The relay 71 is thus actuated to provide a constant output $R_e[K(\Delta T_m-k_0)+1]$ at the line 77. Accordingly, the external reflux rate is maintained constant at this value until the overloading condition is corrected, thus effectively preventing progressive increase in overhead vapor flow and overhead condenser load, together with decrease in $\Delta T$, which would otherwise lead to loss of column pressure control.

Where the overhead from the fractionator does not contain a significant amount of one or more components whose boiling points are significantly lower than that of the light key component or components, control can be effected in accordance with the simplified Equation 2. To this end, the subtractor 72 is eliminated as illustrated in FIG. 4. The external reflux to the column is then controlled in accordance with the output $R_e(1+K\Delta T)$ when the condenser 27 is operating normally, but assumes the constant value $R_e(1+K\Delta T_m)$ should an overloading condition of the condenser arise.

Figure 2:
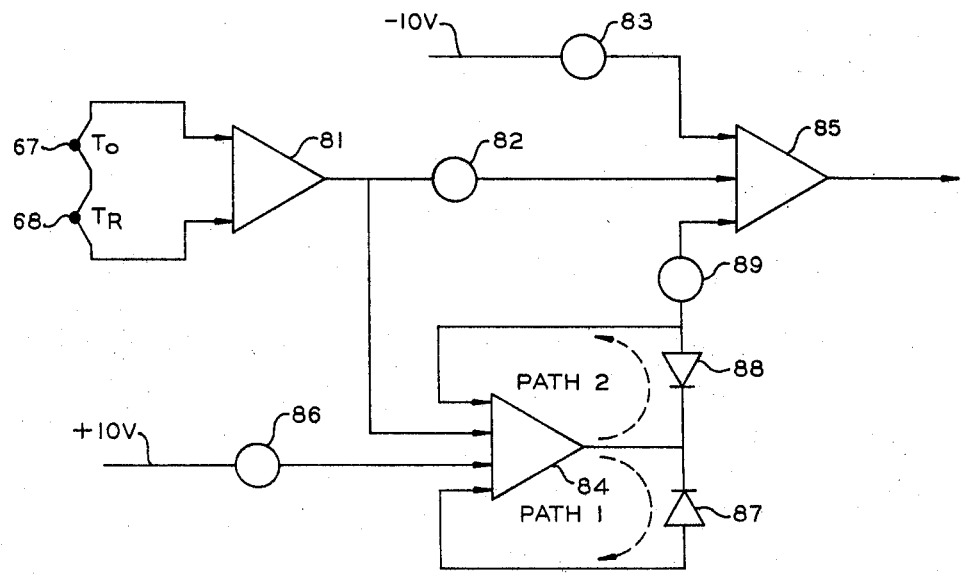
FIGURE 2 is a schematic circuit diagram of the computing circuit.

The preferred embodiment of the control system of this invention is constructed from a novel assembly of conventional electrical instrument components, and this embodiment is illustrated in FIGURE 2. Referring to the latter, the temperature measurements of the overhead vapor, $T_0$, and external reflux, $T_R$, are made by thermocouples 67 and 68, respectively, which have their outputs connected in electrical opposition thus forming a differential thermocouple whose output is connected to the input of an amplifier 81. The output signal $-\Delta T$ from amplifier 81 (which advantageously is employed to increase the output signal from the thermocouples to a convenient level) is applied to a potentiometer 82, the contactor of which is set so that $-\Delta T$ is multiplied by K. The output signal from potentiometer 82, proportional to $-K\Delta T$, is supplied as an input to amplifier 82. A voltage is applied across a potentiometer 83 whose contactor is set so that the output therefrom is proportional to $$-(1-Kk_0)$$

which is employed as a second input signal to amplifier 85. In the event that the measured $\Delta T$ is greater than that of a predetermined limiting differential temperature, $\Delta T_m$, the output signal from amplifier 82 is proportional to $1+K(\Delta T-k_0)$. However, the output from amplifier 81, proportional to $-\Delta T$, is also introduced as an input signal to amplifier 84. In addition, a second input signal is supplied to amplifier 84 from potentiometer 86 which is representative of the limiting $\Delta T_m$.

The output signal of amplifier 84 is proportional to $-(\Delta T_m-\Delta T)$. As long as the absolute value of $\Delta T$ is larger than $\Delta T_m$ the output of amplifier 84 is positive. For this condition, diode 87 conducts and negative feedback is provided through PATH 1. When the absolute value of $\Delta T$ decreases below a positive $\Delta T_m$, the output of amplifier 84 becomes negative and diode 88 starts conducting and PATH 2 provides negative feedback for amplifier 84. For this condition, the output of amplifier 84 is applied across potentiometer 89, where it is multiplied by K, and the output from this potentiometer is proportional to $-(K\Delta T_m-K\Delta T)$ and is supplied as an input to amplifier 82. The resulting sum of the input signals from potentiometers 82 and 89 is $-K\Delta T-K\Delta T_m+K\Delta T$, or $-K\Delta T_m$. Therefore, any time the measured $\Delta T$ is equal to or less than the limiting $\Delta T_m$, the output of amplifier 82 will remain constant at $1+K(\Delta T_m-k_0)$. This latter signal, of course, is multiplied by a value proportional to the flow rate of the external reflux, $R_e$. Thus, the circuit of FIGURE 2 provides the same output, and operates in the same way as the units 71, 72, 73 and 74 of FIGURE 1.

Figure 3:
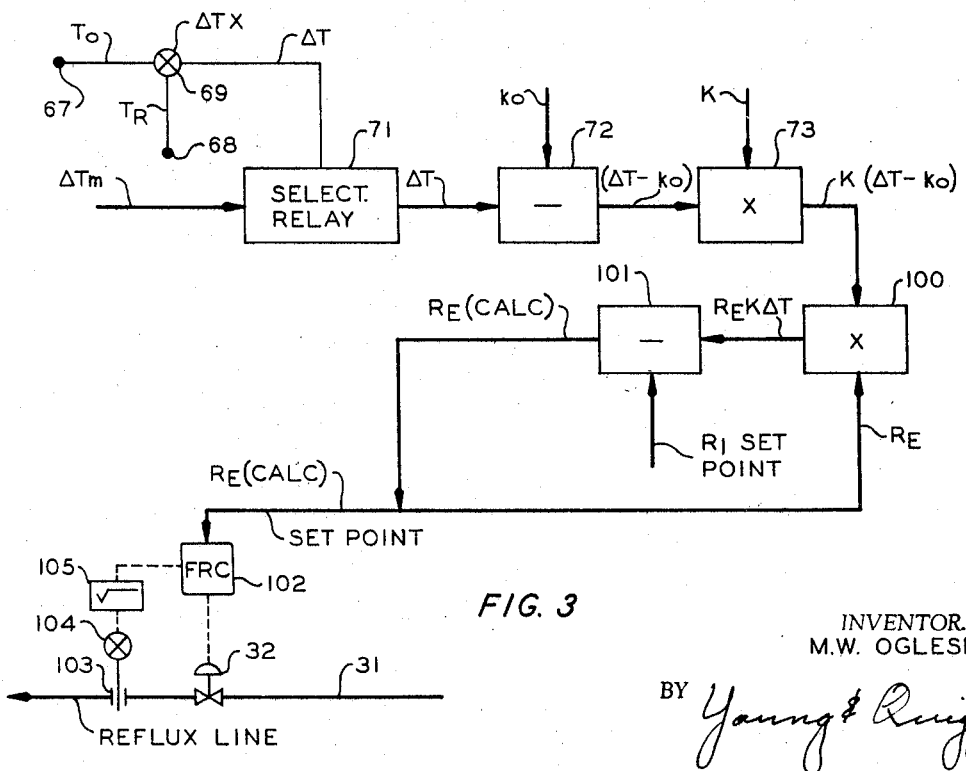
FIGURE 3 is a block diagram of a modified computer circuit.

Referring now to FIGURE 3, I have shown a modified computer system where the column is controlled in accordance with the implicit form of Equation 1. This computer has temperature sensing elements 67, 68, a differential temperature transmitter 69, a selective relay 71, a subtractor 72 and a multiplier 73 similar to those already described in connection with FIGURE 1. In some situations, subtractor 72 can be eliminated, as indicated in FIGURE 4.

The output of the multiplier 73, $K(\Delta T-k_0)$ is fed to a multiplier 100, where it is multiplied by the output signal of the computer which is representative of the calculated external reflux. This signal is fed to a subtractor 101, in which there is subtracted a signal representative of the desired internal reflux $R_i$. The output of the subtractor 101 is, thus, the desired value of external reflux, which is fed back to the multiplier 100. The output of the subtractor 101 is also applied to regulate the setpoint of a flow recorder controller 102 which is connected to control the valve 32 in the reflux line 31. The line 31 has an orifice plate 103 downstream of the valve 32, a differential pressure transducer 104 and a square root extractor 105 which are connected serially to the flow recorder controller 102.

In operation, the computer regulates the setpoint of the controller 102 so as to maintain the computed value of external reflux necessary to provide the desired internal reflux as set at the subtractor 101. In this system, it will be noted that it is not necessary to transmit the measured rate of flow of external reflux to the computer.

The modified computer of FIGURE 3 provides for the introduction of the constant $k_0$, representing the difference between the bubble point temperature and dew point of the external reflux. In the event that the overhead from the fractionator does not contain a significant amount of one or more components whose boiling points are significantly lower than that of the light key component or components, this correction factor can be omitted. In this case, the output of the selective relay 71 is fed directly to the multiplier 73.

In one specific case, a fractionator was controlled in accordance with the invention to separate hydrocarbons having 3 and 4 carbon atoms from heavier hydrocarbons. The column is operated at a feed rate of 1300 barrels per hour at an overhead temperature of 154° F. and a reflux temperature of 97.5° F. The reflux had a composition of 16.0 liquid volume percent propane, 36.9% normal butane, 46.9% isobutane and 0.2 percent normal pentane. $\Delta T$, therefore, was 56.5° F. and the constant $k_0$ was 12.0° F., this being the difference between the bubble point temperature and dew point of the reflux stream. The computed value of the constant K was 0.00435, the external reflux flow was 806 barrels per hour and the desired internal reflux flow was 962.5 barrels per hour.

Without the use of the selective relay 71, FIGURE 1, the condenser 27 was occasionally overloaded, resulting in a progressive decrease in $\Delta T$ and increase in flow of external reflux leading to ultimate loss of column pressure control.

With the selective relay 71 in the circuit set for a limiting $\Delta T_m$ of 25° F., overloading of the condenser 27 was effectively prevented by preventing progressive increases in external reflux. When the upset condition terminated, equilibrium conditions were quickly reestablished leading toward the desired flow of internal reflux.

In the FIGURE 3 control system of this invention, the various computing components necessary in the solution of the equations and the control of reflux are electronic analog components. For example, the differential temperature transmitter 69 can be a Low Level Differential Amplifier, Type 6.422, described in Bulletin No. AC 6201-1 of Electronic Associates, Inc., Long Branch, N.J.; subtractors 72 and 101 can be Dual Operational Amplifiers, Type 6.368, described in said Bulletin, and multipliers 73 and 100 can be Quarter Square Multipliers, Type 7.081, described in the latter Bulletin. Alternatively, said computing components as in FIGURE 1 can be of the pneumatic type. For example, differential temperature transmitter 89 can be a Potentiometer Transmitter 700T, Model 2, described in Bulletin 12A100 of the Taylor Instrument Co., Rochester, N.Y.; subtractor 72 and adder 74 can be Computing Relays Model 56-1, described in Technical Information Bulletin 37-59A of the Foxboro Instrument Co., Mass.; and multipliers 73 and 76 can be Sorteberg Force Bridges, Type C, described in Catalog C80-1 of the Minneapolis Honeywell Co., Philadelphia, Pa.

I claim:

1. In a fractionation system that includes a distillation column, means for supplying heat to the kettle of the column, a condenser, first conduit means to pass vapor from the top of the column to said condenser, and second conduit means to pass condensate from said condenser to the upper region of said column as external reflux; a control system comprising a control valve in said second conduit means, means to establish a first signal which is representative of the temperature differential between said vapor and said external reflux, means to establish a second reference signal which is representative of a minimum temperature differential value corresponding to said first signal that may exist without overloading the condenser, means to compare said first signal and said reference signal and to establish a third signal $\Delta T$ which is representative of the larger of said first and second signals, means to establish a fourth signal $R_e$ which is representative of the rate of flow of external reflux through said second conduit means, means responsive to said third and fourth signals to establish a fifth signal $R_i$ which is representative of the quantity $$R_e(1+K\Delta T)$$

where $K$ is a constant, and means responsive to said fifth signal to control the opening of said valve.

2. The control system of claim 1 wherein said means to establish said fifth signal comprises a first multiplier, means to apply said third signal to one input to said first multiplier, means to apply a constant signal representative of $K$ to the second input of said first multiplier, an adder, means to apply the output of said first multiplier to one input to said adder, means to apply a reference signal representative of the constant 1 to the second input to said adder, a second multiplier, means to apply the output of said adder to one input to said second multiplier, and means to apply said fourth signal to the second input to said second multiplier, the output of said second multiplier being said fifth signal.

3. The control system of claim 1, further comprising means to establish a reference signal $k_0$ which is representative of the difference between the bubble point and the dew point temperature of said external reflux, means to subtract said reference signal $k_0$ from said third signal to establish a sixth signal, and means to apply said sixth signal to said means to establish said fifth signal so that said sixth signal is employed therein as said third signal.

4. In a fractionation system that includes a distillation column, means for supplying heat to the kettle of the column, a condenser, first conduit means to pass vapor from the top of the column to said condenser, and second conduit means to pass condensate from said condenser to the upper region of said column as external reflux; a control system comprising a control valve in said second conduit means, means to establish a first signal which is representative of the temperature differential between said vapor and said external reflux, means to establish a second reference signal which is representative of a minimum temperature differential value corresponding to said first signal that may exist without overloading the condenser, means to compare said first signal and said second signal and to establish a third signal which is representative of the larger of said first and second signals, means to subtract a constant value $k_0$ from said third signal to establish a fourth signal, said constant value $k_0$ being representative of the difference between the bubble point and the dew point temperature of said external reflux, means to multiply said fourth signal by a constant value $K$ to establish a fifth signal, means to add a constant value of 1 to said fifth signal to establish a sixth signal, means to establish a seventh signal which is representative of the rate of flow of external reflux through said second conduit means, means to multiply said sixth signal by said seventh signal to establish an eighth signal, and means responsive to said eighth signal to control the opening of said valve.

5. In a fractionation system that includes a distillation column, means for supplying heat to the kettle of the column, a condenser, first conduit means to pass vapor from the top of the column to said condenser, and second conduit means to pass condensate from said condenser to the upper region of said column as external reflux; a control system comprising:

a control valve in said second conduit means,
a summing amplifier,
a pair of thermocouples connected in electrical opposition to the input of said amplifier, one of said thermocouples measuring the temperature of vapors removed from said column and the other of said thermocouples measuring the temperature of said external reflux,
a potentiometer connected to the output of said amplifier,
a second summing amplifier, leads connecting the output of said potentiometer to one input of the second amplifier,
means for applying a constant voltage to an input of said second amplifier,
a third summing amplifier,
means for applying the output of said first amplifier to the input of said third amplifier,
means for applying a bias signal to the input of the third amplifier,
a first feedback loop connecting the output of the third amplifier to an input thereof,
a diode of one polarity in said feedback loop,
a second feedback loop connecting the output of the third amplifier to an input thereof,
a diode of opposite polarity in said second feedback loop,
a potentiometer having its input connected on the input side of one of said diodes,
means applying the output of the last mentioned potentiometer to the input of said second amplifier,
means to establish a signal which is representative of the rate of flow of external reflux through said second conduit means,
means to multiply said signal by the output signal from said second amplifier to establish a control signal, and
means responsive to said control signal to control the opening of said valve.

6. In a fractionation system that includes a distillation column, means for supplying heat to the kettle of the column, a condenser, first conduit means to pass vapor from the top of the column to said condenser, and second conduit means to pass condensate from said condenser to the upper region of said column as external reflux; a control system comprising a control valve in said second conduit means, means to establish a first signal which is representative of the temperature differential between said vapor and said external reflux, means to establish a second reference signal which is representative of a minimum temperature differential value corresponding to said first signal that may exist without overloading the condenser, means to compare said first signal and said reference signal and to establish a third signal $\Delta T$ which is representative of the larger of said first and second signals, a first signal multiplier, means to apply said third signal to one input of said first multiplier, means to apply a fourth reference signal $K$ to the second input of said first multiplier, a second multiplier, means to apply the output of said first multiplier to one input of said second multiplier, a signal subtractor, means to apply the output of said second multiplier to one input of said subtractor, means to apply a reference signal representative of the desired internal reflux to the second input of said subtractor so as to be subtracted from the output signal from said second multiplier, said subtractor establishing an output signal, means responsive to said output signal to control the opening of said valve, and means to apply said output signal to the second input of said second multiplier.

7. The control system of claim 6, further comprising means to establish a reference signal $k_0$ which is representative of the difference between the bubble point and the dew point temperature of said external reflux, means to subtract said reference signal $k_\beta$ from said third signal to establish a sixth signal, and means to apply said sixth signal to said one input of said first multiplier so that said sixth signal is multiplied therein by said fourth reference signal.

References Cited
UNITED STATES PATENTS

| | | | |
|---|---|---|---|
| 3,158,556 | 11/1964 | Hopper | 202—160 |
| 3,165,454 | 1/1965 | Wienecke | 202—160 |
| 3,203,871 | 8/1965 | Clark et al. | 202—160 |
| 3,259,734 | 7/1966 | Marr | 202—160 |
| 3,271,270 | 9/1966 | Lupfer et al. | 203—2 |
| 3,296,097 | 1/1967 | Lupfer | 203—2 |

OTHER REFERENCES

Computer Control of Distillation Reflux: Lupfer et al., I.S.A. Journal, vol. 6, No. 6, pp. 34–39.

WILBUR L. BASCOMB, JR., *Primary Examiner.*

U.S. Cl. X.R.

203—2, 99, 23; 235—151.12